United States Patent
Tipley et al.

(10) Patent No.: US 7,793,115 B2
(45) Date of Patent: Sep. 7, 2010

(54) METHOD AND APPARATUS FOR OPERATING A POWER FEED IN A COMPUTER SYSTEM

(75) Inventors: Roger Edward Tipley, Houston, TX (US); Robert A Pereira, Houston, TX (US); E David Neufeld, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 906 days.

(21) Appl. No.: 11/531,534

(22) Filed: Sep. 13, 2006

(65) Prior Publication Data

US 2008/0065921 A1    Mar. 13, 2008

(51) Int. Cl.
*G06F 1/00*     (2006.01)
*G06F 1/26*     (2006.01)
*H02H 3/00*     (2006.01)
*H02H 3/027*    (2006.01)
*H02H 3/20*     (2006.01)

(52) U.S. Cl. .................. 713/300; 713/320; 713/340; 361/78; 361/79; 361/83; 361/88; 361/89; 361/90; 361/91.1; 361/91.3

(58) Field of Classification Search .................. 713/300, 713/320, 340; 361/78, 79, 83, 88, 89, 90, 361/91.1, 91.3; 323/234, 299, 318
See application file for complete search history.

(56) References Cited

U.S. PATENT DOCUMENTS

| | | | | |
|---|---|---|---|---|
| 4,628,397 A * | 12/1986 | Gareis et al. | 361/98 |
| 4,951,171 A * | 8/1990 | Tran et al. | 361/90 |
| 4,951,250 A * | 8/1990 | Cruickshank et al. | 710/12 |
| 5,170,311 A * | 12/1992 | Zulaski et al. | 361/94 |
| 5,675,813 A * | 10/1997 | Holmdahl | 713/310 |
| 5,724,026 A * | 3/1998 | Allen | 340/635 |
| 6,473,608 B1 * | 10/2002 | Lehr et al. | 455/402 |
| 6,721,672 B2 * | 4/2004 | Spitaels et al. | 713/324 |
| 6,772,352 B1 * | 8/2004 | Williams et al. | 713/300 |
| 7,017,061 B2 * | 3/2006 | Lippert et al. | 713/324 |
| 7,113,376 B2 * | 9/2006 | Nomura et al. | 361/31 |
| 7,139,920 B2 * | 11/2006 | Williams | 713/300 |
| 7,386,737 B2 * | 6/2008 | Finkelstein et al. | 713/300 |
| 7,536,569 B2 * | 5/2009 | Montero et al. | 713/300 |
| 2005/0022043 A1* | 1/2005 | Yamaji et al. | 713/340 |
| 2005/0028014 A1* | 2/2005 | Allred et al. | 713/300 |
| 2005/0138438 A1* | 6/2005 | Bodas | 713/300 |
| 2006/0282685 A1* | 12/2006 | Bahali et al. | 713/300 |

* cited by examiner

Primary Examiner—Mark Connolly

(57) ABSTRACT

Method, and apparatus for operating a power feed in a computing system. One exemplary embodiment includes monitoring the power feed to ensure the power level of the entire system never remains above a first power level and only remains above a second power level for a period of time determined by a timer level.

17 Claims, 6 Drawing Sheets

METHOD AND APPARATUS FOR OPERATING A POWER FEED IN A COMPUTER SYSTEM

BACKGROUND OF THE INVENTION

National Electrical Code defines "continuous loads" to be loads operating greater than 3 hours. National Electrical Code provides that continuous loads must be sized no more than 80 percent of the capacity ratings of the circuit breaker and power cord supplying power to the circuit. National Electrical Code allows non-continuous loads to operate at 100 percent of the capacity ratings of the circuit breaker and power cord supplying power to the circuit. To maintain compliance with the National Electrical Code, a system with redundant power feeds must size its continuous power consumption load to no more than 80 percent of the capacity of the circuit breaker and power cord of a single power feed. Current industry practice avoids operating systems above 80% by designing systems such that their current draw is much lower than the 80% limit leaving a margin of safety for unexpected power spikes.

DETAILED DESCRIPTION OF THE PREFERRED EMBODIMENTS

Figure 1:
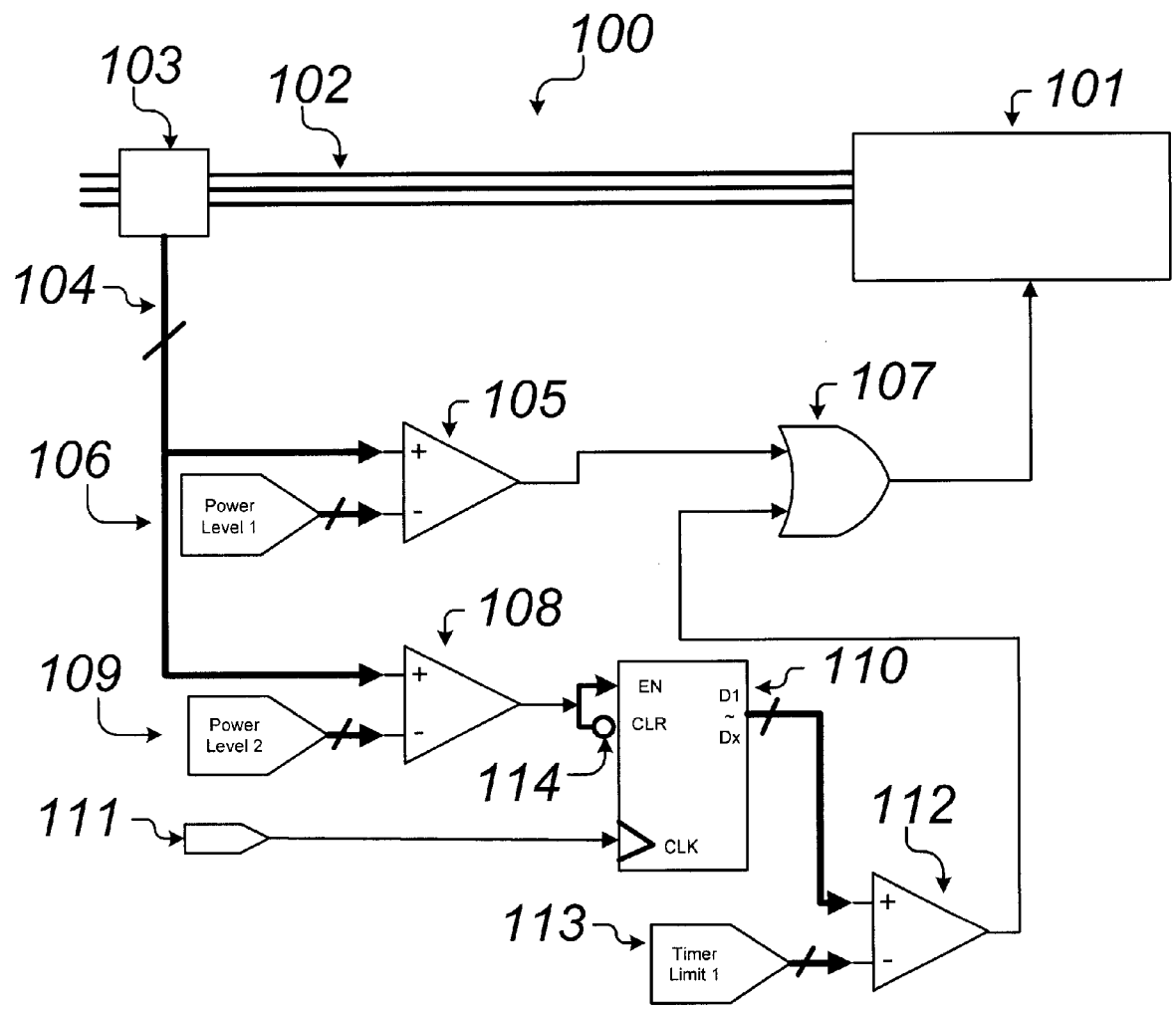
FIG. 1 is a diagram of a circuit controlling a single system in accordance with an exemplary embodiment of the invention.

A sensor is incorporated into the system to determine feed redundancy status, (redundancy sensor). A system is used to determine and track the allocated power budget for all of the sub-systems. This can be accomplished by monitoring stored data for each sub-system which indicated the power requirements for each sub-system, or by accurately measuring the actual power draw of each sub-system.

Once the power needs of a system are understood, a system can monitor for a loss of feed redundancy. When a loss of redundancy occurs, the system starts a timer to determine how long the system has been operating without redundancy. The system then shuts down, or otherwise reduces power to select sub-systems as necessary to maintain a power draw of less than Power Limit 1, typically 100% of the remaining power feeds. While shutting down is one extreme option to achieve power reduction of sub-systems, the preferred embodiment would be to use scaleable power modes in sub-systems which could reduce frequency and/or voltage to achieved a lower power draw without ceasing functionality completely. As the method used to determine which sub-systems are reduced and how that reduction is accomplished is not a subject of this application, further discussion in this area is not necessary. As an additional step, the system could also notify any higher level monitoring system or otherwise raise an alarm signaling the loss of redundancy.

Once the timer reaches a pre-set time "Timer Limit 1" the system will begin shut down of further sub-systems as necessary to maintain a power draw of less than Power Limit 2, typically 80% of the remaining power feeds. As an additional step, the system could also notify any higher level monitoring system or otherwise raise an alarm signaling the further degradation of the system.

At each increment Timer Level 1 the system will verify the power drawn is less than Power Level 2 of the remaining power feeds. If the system is drawing more than Power Level 2, all sub-systems' power will be reduced for a pre-set time "Timer Limit 2". If the power drawn has remained at or below Power Level 2, the system will take no further action to reduce power requirements. The system will continue performing this check at each subsequent increment of Timer Level 1. As an additional step, the system could also notify any higher level monitoring system or otherwise raise an alarm signaling the continued operation of the system in a degraded state.

At anytime during the above sequence, if the redundant power feed is returned to an operational state, as sensed by the redundancy sensors, the timer will be stopped and sub-systems, operating under reduced power, will be allowed to return to normal operation. As an additional step, the system could also notify and higher level monitoring systems or signal an "all is well" state.

In the preferred embodiment, the Timer Level 2 will be such that the system has time to power down all sub-systems before the time limit set for operation of non-continuous load systems as established by the National Electrical Code, or other such regulating body.

In the preferred embodiment, the Timer Level 1 pre-set level will be such that the system has time to power down select sub-systems prior to the expiration of Timer Level 2.

In the preferred embodiment, sub-systems, primary sub-systems, can include optional sub-sub-systems, secondary sub-systems. In such a configuration measurements can be taken for a minimum power requirement for the primary sub-system while operating with secondary sub-systems powered down. A second measurement can be taken for a maximum power requirement for the primary sub-system while operating with secondary sub-system also operating. This information could also be stored as data for each secondary sub-system, and a minimum and maximum power requirement calculated from this stored data.

In the preferred embodiment, when the redundancy sensor determines a loss of redundancy has occurred, it is desirable to shut down secondary sub-systems in an effort to reach the lower power requirements, leaving the primary sub-systems to continue operating until redundancy can be restored. It is also possible to suspend sub-system operation resulting in a lower power level without fully powering down the sub-system FIG. 1 shows a circuit (100) which illustrates an exemplary embodiment of the invention. A system (101) is powered by multiple power lines (102) which are monitored by sensors (103). The sensors (103) report a power level reading for the power lines using a data bus (104). This power level is compared by a comparator (105) against a preset level, "Power Level 1" stored in a buffer (106). If the power level is reported to be higher than Power Level 1 the comparator (105) will output a signal to an OR logic gate (107) which will send the signal to the monitored system (101) requesting immediate power down.

A second buffer (109) stores a second preset power level, "Power Level 2" which is less than Power Level 1. This second preset power level is compared, by a second comparator (108) to the power level reported by the sensors (103). If the power level is reported to be higher than Power Level 2 the second comparator (108) will output a signal to the enable (EN) input of a counter (110). The counter (110) is also connected to a free running clock (111). The signal from the second comparator (108) enables the counter (110) to count pulses from the free running clock (111). The multi-bit output from the timer is compared by a third comparator (112) to a pre-set time "Timer Limit 1" stored in a buffer (113). When a preset time has passed, as determined by the setting in the buffer (113) storing Timer Limit 1, the third comparator (112) will output a signal to an OR logic gate (107) which will send the signal to the monitored system (101) requesting immediate power down. The output signal of the comparator (108) is connected through a signal inverter, or NOT logic gate (114) to the clear (CLR) input of the counter. This allows the counter to reset, restarting the clock if the power drops below Power Level 2.

Figure 2:
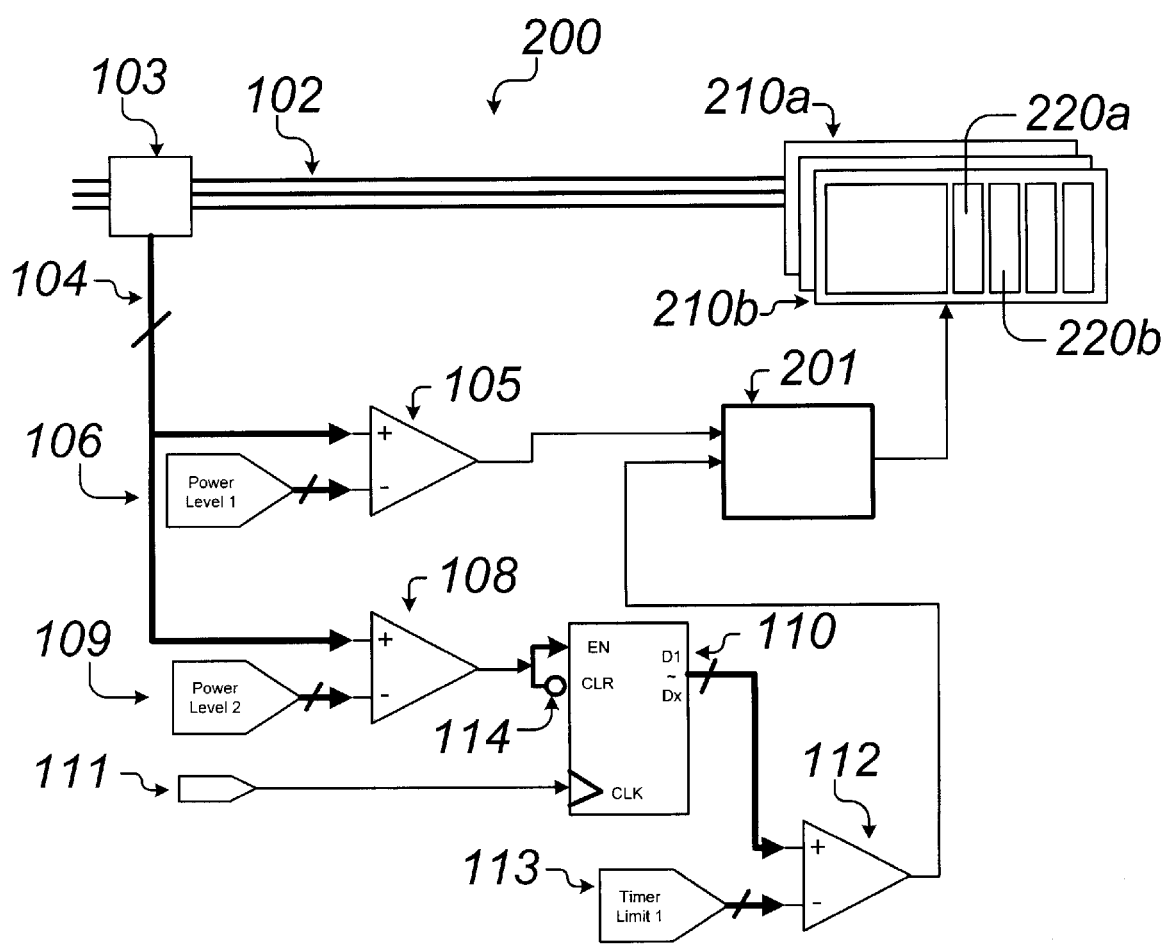
FIG. 2 is a diagram of a circuit controlling multiple systems in accordance with an exemplary embodiment of the invention.

FIG. 2 shows a circuit (200) which illustrates an exemplary embodiment of the invention. Multiple systems (210a, 210b), composed of sub-systems (220a, 220b) are powered by multiple power lines (102) which are monitored by sensors (103). The sensors (103) report a power level reading for the power lines using a data bus (104). This power level is compared by a comparator (105) against a preset high level Power Level 1 stored in a buffer (106). If the power level is reported to be higher than Power Level 1 the comparator (105) will output a signal to a micro-controller (201) which will selectively send signals to monitored sub-systems (220a, 220b) requesting immediate power down. In the event power can not be reduced enough to reset the signal being received from comparator (105), the micro-controller will selectively send signals to monitored sub-systems (210a, 210b) requesting immediate power down.

A second buffer (109) stores a second preset power level, "Power Level 2" which is less than Power Level 1. This second preset power level is compared, by a second comparator (108) to the power level reported by the sensors (103). If the power level is reported to be higher than Power Level 2 the second comparator (108) will output a signal to the enable (EN) input of a counter (110). The counter (110) is also connected to a free running clock (111). The signal from the second comparator (108) enables the counter (110) to count pulses from the free running clock (111). The multi-bit output from the timer is compared by a third comparator (112) to a pre-set time Timer Limit 1 stored in a buffer (113). When a preset time has passed, as determined by the setting in the buffer (113) storing Timer Limit 1, the third comparator (112) will output a signal to an micro-controller (201) which will selectively request immediate power down of sub-system (220a, 220b) and/or system (210a, 210b) as discussed above. The output signal of the comparator (108) is connected through a signal inverter, or NOT logic gate (114) to the clear (CLR) input of the counter. This allows the counter to reset, restarting the clock if the power drops below Power Level 2.

Figure 3:
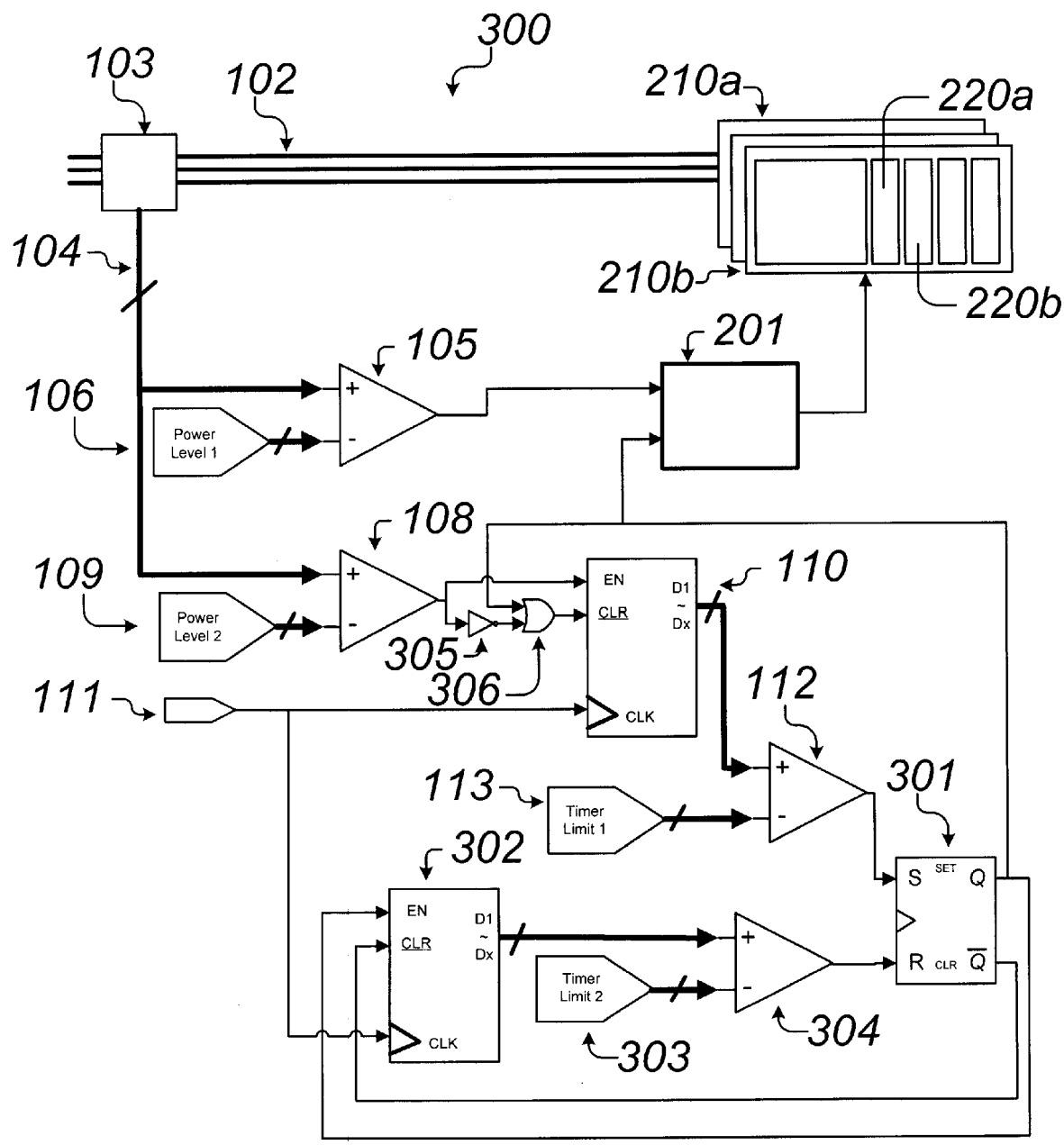
FIG. 3 is a diagram of a circuit controlling multiple systems and allowing multiple reset sequences in accordance with an exemplary embodiment of the invention.

FIG. 3 shows a circuit (300) which illustrates an exemplary embodiment of the invention, as previously illustrated in FIG. 2, but with an optional reset circuit. In this embodiment, the output signal from the second comparator (108) is connected directly to the EN input of the counter, and also connected through a NOT logic gate and a OR logic gate to the CLR input of the counter, to allow the counter to reset if the power drops below Power Level 2 as stored in buffer (109). The output of the timer is still compared by comparator (112) to Timer Level 1, as stored in the buffer (113). However, in this embodiment, the output of the comparator is connected to the SET input of a Set/Reset Flip-Flop (SR-FF) (301). The Q output of the SR-FF connects to the micro-controller (201) and to the CLR input of the first counter. The Q output also connects to the EN pin on a second counter (302). This second counter is connected to the free running clock (111) so it begins counting when the first counter reaches Timer Level 1. The second counter (302) continues counting until comparator (304) determines it has reached a Timer Level 2, as stored in buffer (303). Once Timer Level 2, is reached, the comparator (304) will output a signal which is connected to the Reset (R) pin of the SR-FF. The R pin caused the SR-FF to reset, lowering its Q signal causing Timer 2 (302) to reset and Timer 1(110) to once again begin counting. The affect of this is to have Timer 1 and Timer 2 alternately count their timer periods asserting a signal to the micro-controller (201) at the end of the time period Timer Level 1, and holding that signal until the time period Timer Level 2, then repeating the process.

Figure 4:
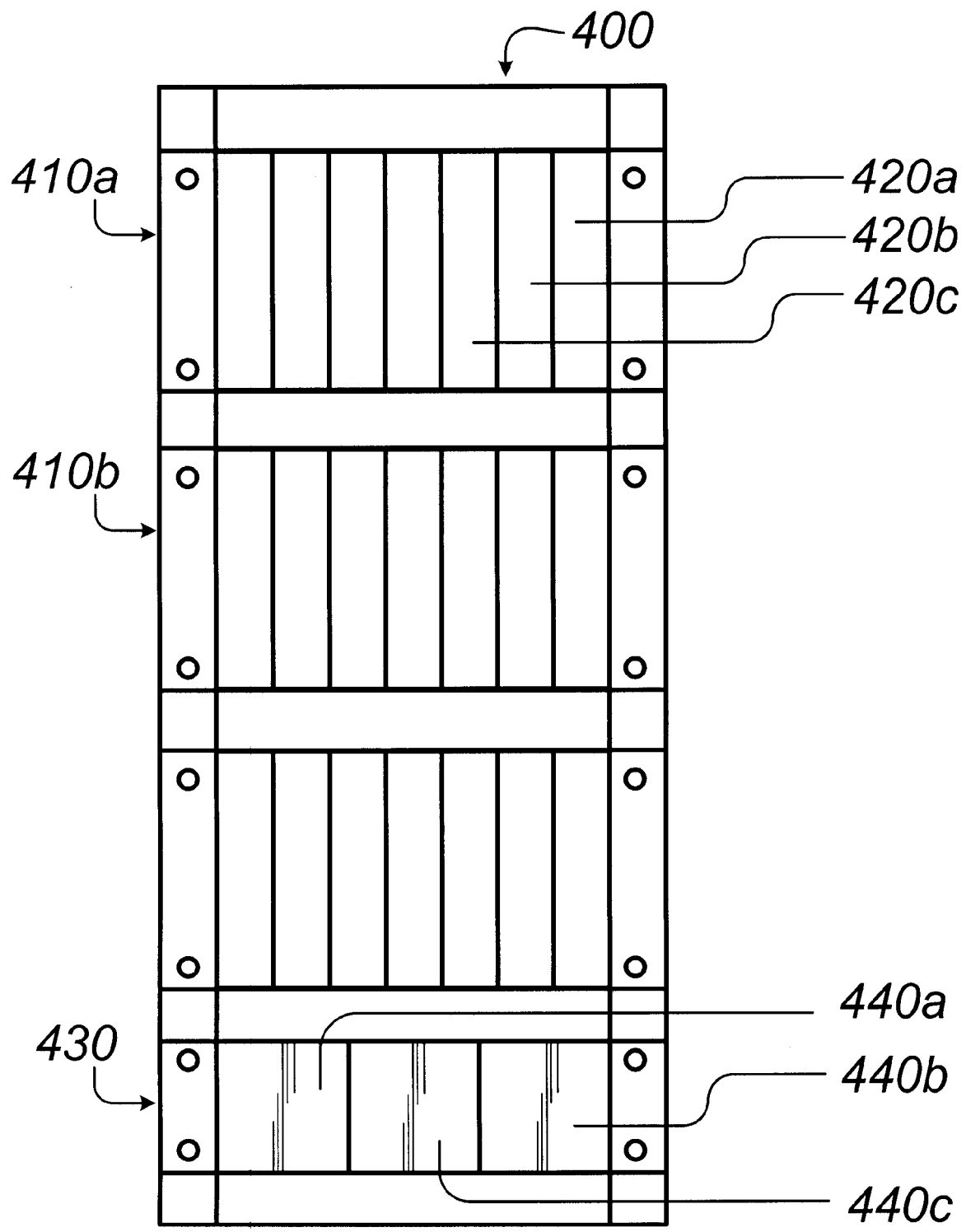
FIG. 4 is a depiction of a system with multiple sub-system as may be controlled by an exemplary embodiment of the invention.

FIG. 4 illustrates an exemplary system (400) controlled by the embodiment of the invention. A Rack system (400) is comprised of multiple Blade Enclosures (410a, 410b). Each Blade Enclosure (410) contains multiple blade computers (420a, 420b, 420c). The Rack is power by multiple power supplies (440a, 440b, 440c) running in a redundant configuration and housed in a power supply housing (430).

Figure 5:
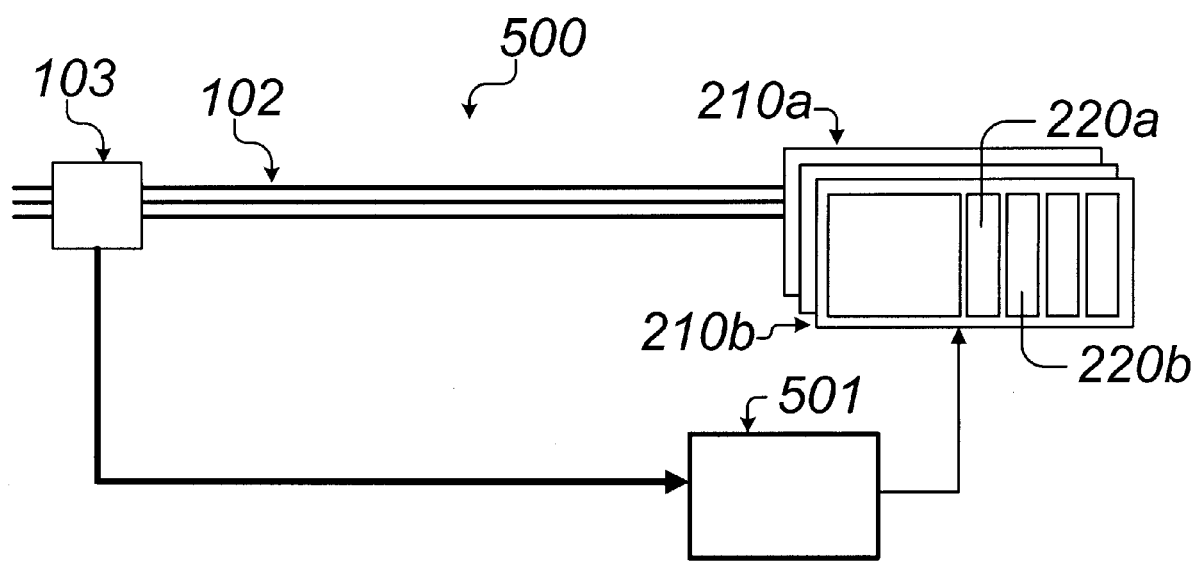
FIG. 5 is a depiction of a system with a micro-controller controlling multiple sub-systems as may be controlled by an exemplary embodiment of the invention.
Figure 6:
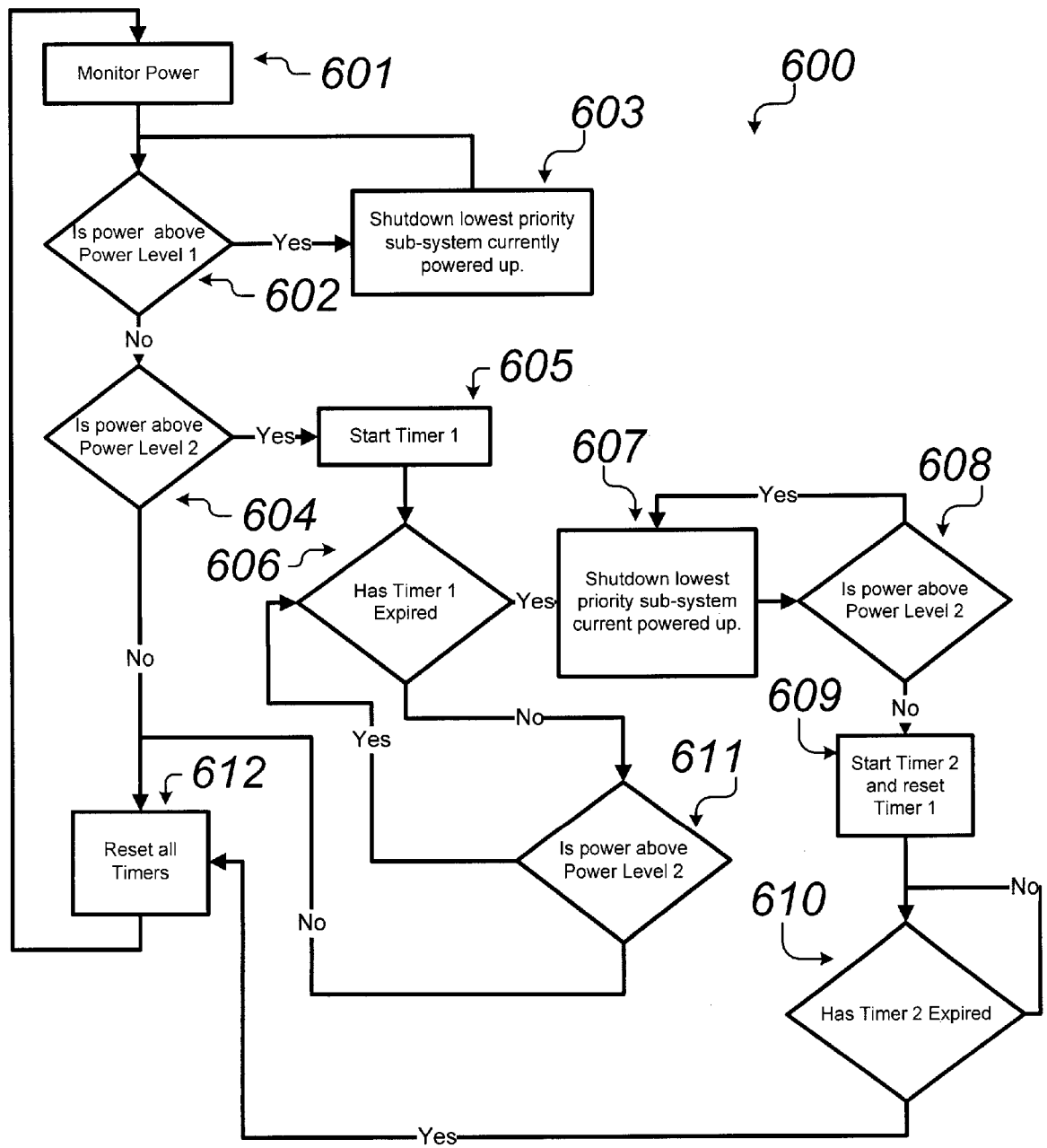
FIG. 6 is a flow chart for controlling multiple systems in accordance with an exemplary embodiment of the invention.

FIGS. 5 and 6 illustrates and exemplary system considered by the inventors to be the preferred embodiment of the invention. FIG. 5 shows a system (500) with a micro-controller (501) receiving input from a sensor (103) monitoring power inputs (102) to the sub-systems (210a, 210b, 220a, 220b). As micro-controller (501) are know to comprise buffers, counters and timers, the micro controller implements a process as defined in flowchart (600) illustrated in FIG. 6. The system monitors power, by reading input from sensor (103). If power level is determined to be above a preset level, Power Level 1 (602) the system will begin shutting down lowest priority sub-systems (603). After shutting down lowest priority sub-systems (603) the power is again checked to determine if it is above Power Level 1(602). If power is determined to be below Power Level 1, the power is checked to determine if it is above Power Level 2 (604). If power is above Power Level 2, Timer 1, a count down timer initially set to Timer Level 1, is started. While Timer 1 counts down (606), power is constantly rechecked to see if it has fallen to below Power Level 2 (611). If power falls below Power Level 2 at any time before Timer 1 expires, then all timers are reset (612) and the system returns to the main task of Monitoring Power (601). If Timer 1 expires, the system will shutdown the lowest priority sub-system (607), then check to see if power is still above Power Level 2 (608). If power remains above Power Level 2, the system will select the next lowest priority sub-system to shutdown (607). Once power is reduced to below Power Level 2(608), Timer 2, a count down timer initially set to Timer Level 2, is started (609). Once Timer 2 expires (610), all timers are reset (612) and the system returns to the main task of Monitoring Power (601). This process is constantly repeated ensuring that power never remains above Power Level 1, and only remains above Power Level 2 for a period of time determined by Timer Level 1, at which time it will be lowered for at least a period of time equal to Timer Level 2.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory (such as memory of the handheld portable electronic device) and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of operating a power feed in a computer system comprising:
   monitoring the power feed to ensure the power level of the entire system never remains above a first power level;
   monitoring the power feed to ensure the power level of the entire system only remains above a second power level for a period of time determined by a first timer level;
   lowering the power level of the entire system, after the period of time determined by the first timer level, for a second period of time equal to a second time level; and
   allowing the power level of the entire system to return to a level above the second power level after the second period of time.

2. The method of claim 1, wherein the second power level is below the first power level.

3. The method of claim 1, wherein the first timer level and the second timer level combined are less than a limit of a standard electrical code.

4. The method of claim 3, wherein the standard electrical code is the "National Electrical Code".

5. The method of claim 1 wherein lowering the power level of the entire system further comprises notifying a higher level monitoring system of change in power characteristics.

6. The method of claim 1 wherein lowering the power level of the entire system further comprises turning off a plurality of sub-systems.

7. The method of claim 1 wherein lowering the power level of the entire system further comprises suspending operations of a plurality of sub-systems without removing power to the sub-systems.

8. A computing system, comprising:
   a plurality of sub-systems capable of independent power states;
   a plurality of power feeds providing power to the sub-systems;
   a sensor monitoring state of the power feeds; and
   a processor monitoring the sub-systems and configured to:
      monitor the sensor to ensure the power level of the entire system never remains above a first power level;
      when the power level of the entire system rises above the first power level, request a plurality of sub-systems change power state, thereby lowering the power level of the entire system;
      monitor the power feed to ensure the power level of the entire system never remains above a second power level for a period of time set by a timer level; and
      if the power level of the entire system exceeds the second power level, after returning the system to below the second power level:
         start a second timer; and
         prevent a plurality of sub-systems from changing power state to raise the power level of the entire system, until the second timer reaches a time set by a second timer level.

9. The computing system, of claim 8, wherein the processor monitoring the subsystems and configured to monitor the power feed to ensure the power level of the entire system never remains above a second power level for a period of time set by a timer level, further comprises:
   when the power level of the entire system rises above the second power level:
      starting a timer; and
      monitoring the timer, comprising:
         if the power level of the entire system falls below the second power level, stopping the timer; and
         if the timer reaches a time set by the timer level, request a plurality of sub-systems change power state, thereby lowering the power level of the entire system below the second power level.

10. The computing system of claim 8, further configured to:
   report to a higher level monitoring system when the power level of the entire computer system rises above the first power level.

11. The computer system of claim 8, further configured to:
   report to a higher level monitoring system when the power level of the entire computer system is above the second power level.

12. The computer system of claim 8, wherein the processor monitoring the sub-systems is configured by instructions stored in Read Only Memory (ROM).

13. The computer system of claim 8, wherein the processor monitoring the sub-systems is configured by instructions stored on a removable memory module.

14. A computing system, comprising:
   a plurality of sub-systems capable of independent power states;
   a plurality of power feeds providing power to the sub-systems;
   a sensor monitoring state of the power feeds; and an electrical circuit configured to:
monitor the sensor to ensure the power level of the entire system never remains above a first power level;
when the power level of the entire system rises above the first power level, request a plurality of sub-systems change power state, thereby lowering the power level of the entire system;
monitor the power feed to ensure the power level of the entire system never remains above a second power level for a period of time measured by a timer set by a timer level; and
after lowering the power level of the entire system below the second power level:
starting a second timer; and
preventing a plurality of sub-systems from changing power state to raise the power level of the entire system, until the second timer reaches a time set by a second timer level.

15. The computing system of claim 14, wherein the electrical circuit configured to monitor the power feed to ensure the power level of the entire system never remains above a second power level for a period of time set by a timer level, further comprises:

when the power level of the entire system rises above the second power level:
starting a timer;
monitoring the timer, comprising:
if the power level of the entire system falls below the second power level, stopping the timer; and
if the timer reaches a time set by the timer level, request a plurality of sub-systems change power state, lowering the power level of the entire system below the second power level.

16. The computing system of claim 14, further configured to:
report to a higher level monitoring system when the power level of the entire computer system rises above the first power level.

17. The computer system of claim 14, further configured to:
report to a higher level monitoring system when the power level of the entire computer system is above the second power level.

\* \* \* \* \*

UNITED STATES PATENT AND TRADEMARK OFFICE
CERTIFICATE OF CORRECTION

| | | |
|---|---|---|
| PATENT NO. | : 7,793,115 B2 | Page 1 of 1 |
| APPLICATION NO. | : 11/531534 | |
| DATED | : September 7, 2010 | |
| INVENTOR(S) | : Roger Edward Tipley et al. | |

It is certified that error appears in the above-identified patent and that said Letters Patent is hereby corrected as shown below:

In column 6, line 32, in Claim 9, delete "system," and insert -- system --, therefor.

Signed and Sealed this
First Day of March, 2011

David J. Kappos
*Director of the United States Patent and Trademark Office*